United States Patent
Mitsuyoshi et al.

[11] Patent Number: 5,828,033
[45] Date of Patent: Oct. 27, 1998

[54] METHOD OF MANUFACTURING A FUEL TANK

[75] Inventors: Hiroshi Mitsuyoshi; Hiroki Goto; Yasuo Masuda, all of Kumamoto, Japan

[73] Assignee: Honda Giken Kogyo Kabushiki Kaisha, Tokyo, Japan

[21] Appl. No.: 690,571

[22] Filed: Jul. 26, 1996

[30]     Foreign Application Priority Data

Nov. 30, 1995  [JP]  Japan ..................................... 7-311934

[51] Int. Cl.⁶ .................................................. B23K 26/00
[52] U.S. Cl. ........................................................ 219/121.64
[58] Field of Search ........................ 219/121.63, 121.64, 219/121.13, 121.14; 228/135

[56]             References Cited

U.S. PATENT DOCUMENTS

| | | | |
|---|---|---|---|
| 4,713,520 | 12/1987 | Van Nice et al. .................. | 219/121.63 |
| 4,735,275 | 4/1988 | Tsukahara et al. ...................... | 180/215 |
| 4,756,069 | 7/1988 | Morikawa .................................. | 29/463 |
| 5,060,748 | 10/1991 | Iwai et al. ................................ | 180/215 |
| 5,064,016 | 11/1991 | Iwai et al. ................................ | 180/215 |
| 5,083,632 | 1/1992 | Saito et al. ............................... | 180/215 |
| 5,107,952 | 4/1992 | Matsubayashi et al. ................. | 180/349 |
| 5,299,965 | 4/1994 | Lee ...................................... | 219/121.64 |
| 5,330,028 | 7/1994 | Handa et al. ............................. | 180/219 |
| 5,616,261 | 4/1997 | Forrest ................................ | 219/121.63 |
| 5,618,452 | 4/1997 | Matubara et al. ................... | 219/121.64 |

FOREIGN PATENT DOCUMENTS

| | | | |
|---|---|---|---|
| 622150 | 11/1994 | European Pat. Off. .......... | 219/121.63 |
| 3407770 | 9/1985 | Germany ........................... | 219/121.64 |
| 56-62688 | 5/1981 | Japan . | |
| 57-149083 | 9/1982 | Japan ................................ | 219/121.64 |
| 60-255294 | 12/1985 | Japan . | |
| 62-192287 | 8/1987 | Japan ................................ | 219/121.64 |
| 2-20676 | 1/1990 | Japan ................................ | 219/121.64 |
| 3-221275 | 9/1991 | Japan . | |
| 5-39543 | 2/1993 | Japan . | |
| 6-15471 | 1/1994 | Japan ................................ | 219/121.63 |
| 6-47572 | 2/1994 | Japan . | |

*Primary Examiner*—Geoffrey S. Evans
*Attorney, Agent, or Firm*—Merchant, Gould, Smith, Edell, Welter & Schmidt

[57]             ABSTRACT

Upper and lower shell members of aluminum-plated steel panels have respective flanges overlapping each other and welded to each other by a laser beam, forming a fuel tank. One of the flanges has a stepped region spaced from the other of the flanges, defining a gap between the stepped region and the other flange. The laser beam is applied to the flanges closely to the gap for discharging unwanted components such as aluminum from a welded area of the flanges into the gap. Therefore, the amount of aluminum contained in the welded area is reduced to increase the bonding strength of the welded area.

8 Claims, 6 Drawing Sheets

FIG. 1
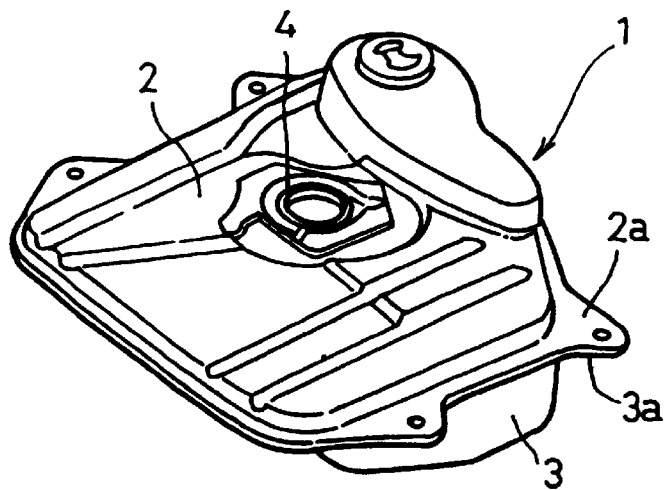
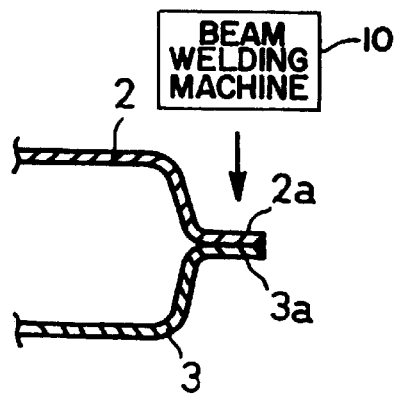
FIG. 2(A)
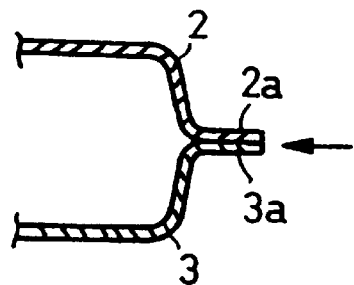
FIG. 2(B)
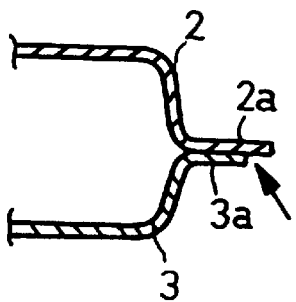
FIG. 2(C)

METHOD OF MANUFACTURING A FUEL TANK

BACKGROUND OF THE INVENTION

1. Field of the Invention

The present invention relates to an improvement in the technology of beam-welding aluminum-plated steel panels into an assembly such as a fuel tank for use on motor vehicles.

2. Description of the Related Art

Fuel tanks for use on motor vehicles such as motor scooters or the like are generally made of tin-lead-plated steel panels or zinc-nickel-plated steel panels for making their inner surfaces resistant to corrosion. Since certain legal restrictions are imposed on the use of plated lead layers for environmental protection purposes, however, there have been demands in the art for fuel tanks of other materials. One such fuel tank is made of steel panels each having fusible plated aluminum layers on both of its surfaces, the steel panels having marginal edges superposed one on the other and welded to each other. Because of the plated aluminum layers on both surfaces of the steel panels, the fuel tank of this structure is corrosion-resistant on its inner and outer surfaces.

Generally, steel panels for making up fuel tanks have heretofore been welded by resistance seam welding. If the resistance seam welding process is employed to weld steel panels each having fusible plated aluminum layers on both of its surfaces, then it suffers the following drawbacks:

The welding electrodes of the welding machine need to be cleaned and shaped frequently because plated aluminum segments tend to become attached to the welding electrodes during the welding process.

Since the plated aluminum layers are highly conductive of heat and electricity, the steel panels cannot be welded unless they are supplied with a large electric current which is 1.5~2.0 times the electric current which is required by ordinary steel panels.

Because the amount of heat applied to the steel panels is large during the welding process and hence the surface layers of the steel panels are destroyed in a wide area by the applied heat, a surface treatment subsequent to the welding process is required especially on the inner surface of the fuel tank to withstand corrosion.

SUMMARY OF THE INVENTION

It is therefore an object of the present invention to provide a welding process of beam-welding aluminum-plated steel panels into an assembly in a manner to eliminate a subsequent corrosion-preventive treatment on its inner and outer surfaces, increase the strength of welded joints, prevent plated aluminum segments from being attached to welding electrodes, and minimize the area in which surface layers of the steel panels are destroyed.

According to the present invention, there is provided a method of manufacturing a fuel tank of aluminum-plated steel panels, comprising the steps of overlapping respective flanges of a pair of shell members of aluminum-plated steel panels, and welding the flanges to each other with a beam, thereby forming a fuel tank.

The beam may be applied to the flanges from a beam welding machine substantially perpendicularly to the flanges while the beam welding machine is moving along an entire peripheral edge of the flanges. Alternatively, the beam may be applied to outer peripheral edges of the flanges from a beam welding machine substantially parallel to the flanges while the beam welding machine is moving fully along the outer peripheral edges of the flanges. Further alternatively, one of the flanges may project a longer distance outwardly than the other flange, and the beam may be applied obliquely to an outer peripheral edge of the shorter flange from a beam welding machine while the beam welding machine is moving fully along outer peripheral edges of the flanges.

According to the present invention, there is also provided a method of laser-beam-welding aluminum-plated steel panels, comprising the steps of overlapping flanges of a pair of aluminum-plated steel panels with a gap defined therebetween, and welding the flanges to each other with a beam applied closely to the gap while discharging unwanted components from a welded area into the gap.

One of the aluminum-plated steel panels may have a stepped region spaced from the other of the aluminum-plated steel panels, thereby defining the gap between the stepped region and the other of the aluminum-plated steel panels. The aluminum-plated steel panels may be welded into a container such as a fuel tank, and the gap may open inwardly into the container or outwardly of the container.

According to the present invention, there is further provided a weldment produced by beam welding, comprising a pair of aluminum-plated steel panels welded to each other by a beam, the aluminum-plated steel panels being joined to each other by a welded area which contains at most 0.65 weight % of aluminum.

According to the present invention, there is also provided a fuel tank produced by beam welding, comprising a pair of shell members of aluminum-plated steel panels having respective flanges overlapping each other and welded to each other by a beam, the flanges being joined to each other by a welded area which contains at most 0.65 weight % of aluminum.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a perspective view of a fuel tank made up of aluminum-plated steel panels produced by a manufacturing method according to the present invention;

FIGS. 2A through 2C are fragmentary cross-sectional views illustrative of various welding methods according to the present invention;

DETAILED DESCRIPTION OF THE PREFERRED EMBODIMENTS

Figure 3:
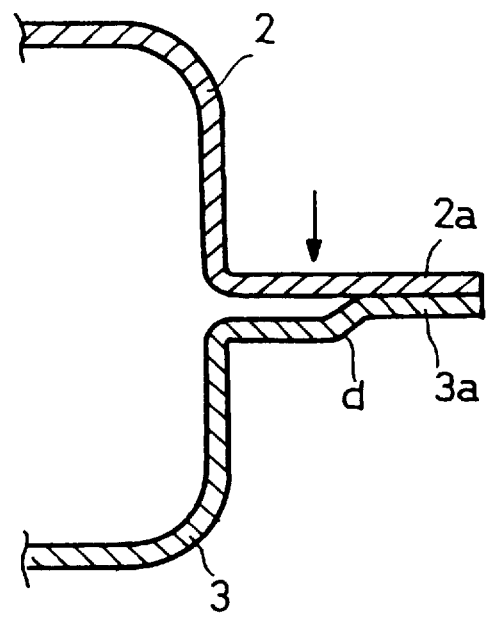
FIG. 3 is a fragmentary cross-sectional view of a fuel tank comprising welded aluminum-plated steel panels, one of which has a stepped region to create an inwardly open gap.

As shown in FIG. 1, a fuel tank 1 made up of aluminum-plated steel panels produced by a manufacturing method according to the present invention comprises a pair of upper and lower shell members 2, 3 which are pressed from aluminum-plated steel panels. The upper and lower shell members 2, 3 have respective flanges 2a, 3a overlapped and welded, along their entire peripheral lengths, to each other into a hermetically sealed welded area by laser beam welding. A fuel inlet fitting 4 and various other small accessories such as stays are joined to the upper and lower shell members 2, 3 by laser beam welding or brazing.

Each of the aluminum-plated steel panels comprises a steel panel of SA1E60 steel or SA1E60Y steel, which is produced by chromating SA1E60 steel, the steel panel being plated with aluminum on its both surfaces. The SA1E60 steel or the SA1E60Y steel contains, in addition to carbon, silicon and manganese that are required for refining purposes and also impurities including phosphorus, sulfur, etc.

Iron has a melting point of 1540° C. and a boiling point of 2750° C., and aluminum has a melting point of 660° C. and a boiling point of 2470° C.

The flanges 2a, 3a of the upper and lower shell members 2, 3 may be overlapped and welded by any of various welding methods shown in FIGS. 2(A) through 2(C).

According to the welding method shown in FIG. 2(A), a laser beam, indicated by the arrow, is applied to the flanges 2a, 3a from a laser beam welding machine 10 substantially perpendicularly to the flanges 2a, 3a while the laser beam welding machine is moving fully along the outer peripheral edges of the flanges 2a, 3a. This welding method is highly resistant to undesirable positional misalignment of the laser beam on the flanges 2a, 3a. However, the upper surface of the weld bead on the welded flanges 2a, 3a should be coated with a corrosion-resistant layer to keep a desired level of aesthetic appearance.

According to the welding method shown in FIG. 2(B), a laser beam, indicated by the arrow, is applied to the outer peripheral edges of the flanges 2a, 3a from a laser beam welding machine substantially parallel to the flanges 2a, 3a while the laser beam welding machine is moving fully along the outer peripheral edges of the flanges 2a, 3a. This welding method does not require the weld bead to be coated with a corrosion-resistant layer, though its ability to prevent undesirable positional misalignment of the laser beam on the flanges 2a, 3a is relatively poor.

According to the welding method shown in FIG. 2(C), one of the flanges 2a, 3a, e.g., the flange 2a, projects a longer distance outwardly than the flange 3a, and a laser beam, indicated by the arrow, is applied obliquely to the outer peripheral edge of the shorter flange 3a from a laser beam welding machine while the laser beam welding machine is moving fully along the outer peripheral edges of the flanges 2a, 3a. This welding method is fairly resistant to undesirable positional misalignment of the laser beam on the flanges 2a, 3a. However, a corrosion-resistant layer should be coated on the upper surface of the weld bead on the welded flanges 2a, 3a to keep a desired level of aesthetic appearance.

When the welding method shown in FIG. 2(A) is employed, if the flanges 2a, 3a are held in intimate contact with each other while being laser-beam-welded, then the bonding strength of the flanges 2a, 3a is greatly reduced, and is related to the speed at which the laser beam welding machine moves.

Generally, when zinc-plated steel panels are welded to each other by a laser beam, since the plated zinc layers have a low boiling point, blowholes are produced in the welded area due to a zinc vapor. It has been proposed to provide a gap between the zinc-plated steel panels to discharge such a zinc vapor (see, for example, Japanese patent publication No. 4-13077).

When aluminum-plated steel panels are welded by a laser beam, no blowholes are produced in the welded area by an aluminum vapor because the plated aluminum layers have a high boiling point. It has been found that the strength of the welded area of such aluminum-plated steel panels greatly varies depending on the metal composition of the welded area.

Figure 8:
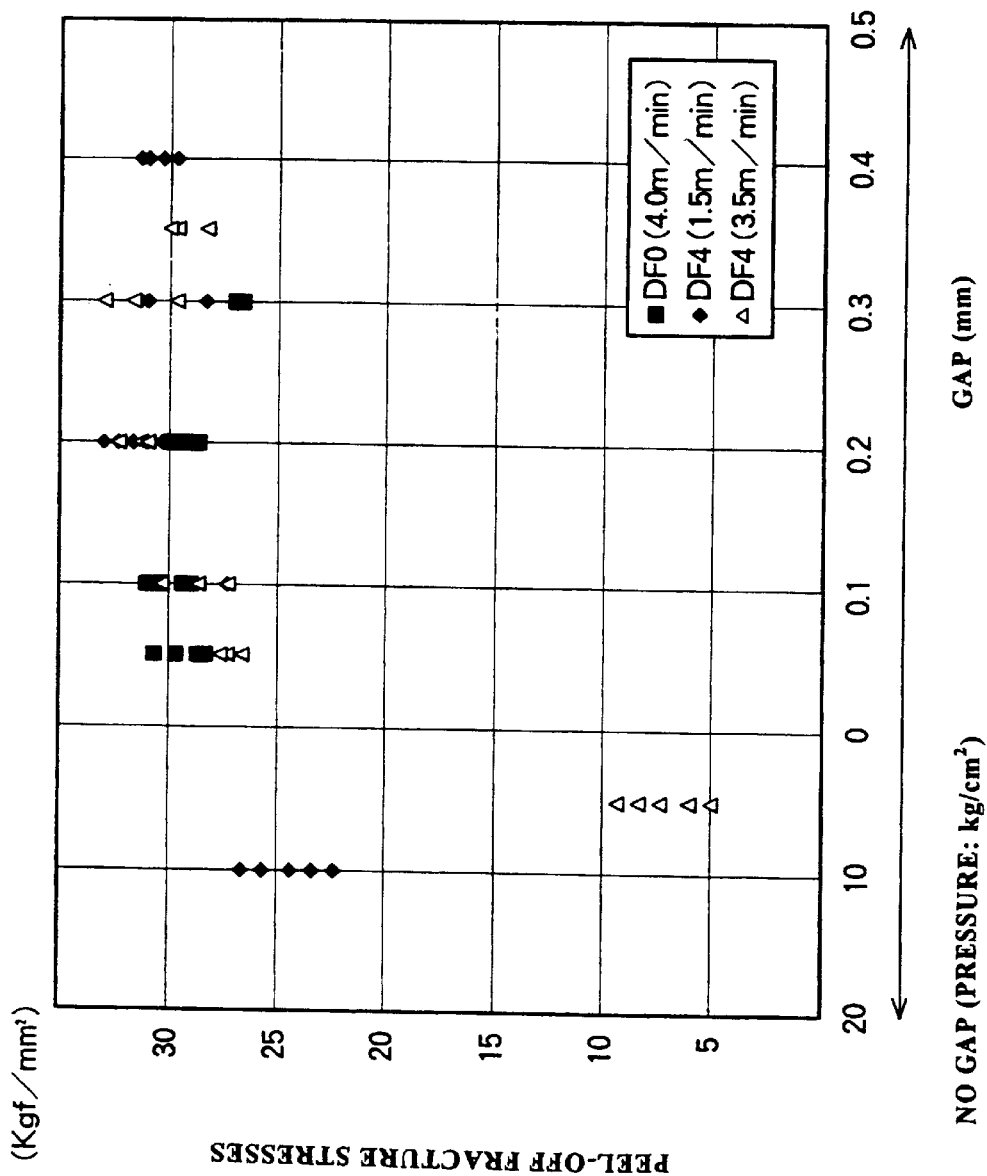
FIG. 8 is a graph showing the results of a tensile test conducted on the test pieces for checking the bonding strength.

The inventors conducted a tensile test on test pieces T (see FIG. 5) each in the form of an aluminum-plated steel panel. The test pieces T were spaced at different gaps or distances from each other by spacers S, and laser-beam-welded to each other by a laser beam welding machine while the laser beam welding machine was moving at different speeds. Thereafter, the tensile test was conducted on the welded test pieces T to check their bonding strength. The results of the tensile test are shown in FIG. 8.

Figure 5:
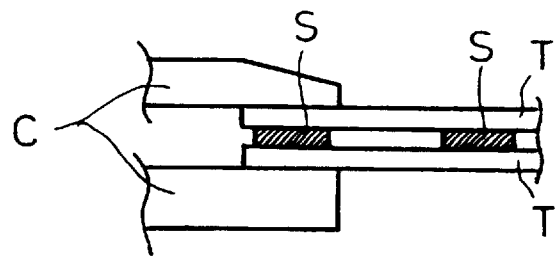
FIG. 5 is an elevational view showing the manner in which test piece are welded.

When there is no gap between the test pieces T, the pressure imposed on the test pieces T was varied by clamps C (see FIG. 5). When there is a gap between the test pieces T, the gap between the test pieces T was varied by varying the height of the spacers S. In FIG. 8, the horizontal axis represents the gap (mm) between the test pieces T and also the pressure (kg/cm$^2$) applied to the test pieces T if there is no gap therebetween, and the vertical axis represents the peel-off fracture stresses (kgf/mm$^2$). The marks Δ, ■ represent samples which were welded by the laser beam welding machine that moved at a speed equivalent to the speed used by a seam welding machine. Specifically, the mark Δ represents samples which were welded by the laser beam welding machine that moved at a speed of 3.5 m/min. while the laser beam focused at a point 4 mm above the upper test piece T, and the mark ■ represents samples which were welded by the laser beam welding machine that moved at a speed of 4.0 m/min. while the laser beam focused at a point on the upper surface of the upper test piece T. The mark ♦ represents samples which were welded by the laser beam welding machine that moved at a substantially lower speed of 1.5 m/min. while the laser beam focused at a point 4 mm above the upper test piece T.

Figure 10:
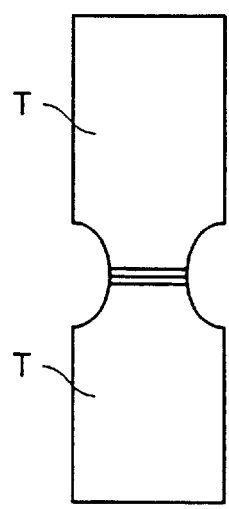
FIG. 10A is a front elevational view of test pieces used in the tensile test.
FIG. 10B is a side elevational view of the test pieces shown in FIG. 10A.
Figure 10:
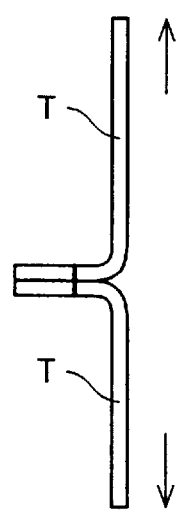

As shown in FIGS. 10(A) and 10(B), the test pieces T were of an L shape, and shorter arms of the test pieces T were overlapped and welded. In the tensile test, longer arms of the test pieces T were pulled in opposite directions indicated by the arrows in FIG. 10(B).

When there was no gap between the test pieces T and the pressure applied to the test pieces T was 5 kg/cm$^2$, the peel-off fracture stresses of the samples Δ were in the range from 5 to 10 kgf/mm$^2$, and those of the samples ■ were lower (not shown). Therefore, the peel-off fracture stresses of the samples Δ, ■ were very low. When the there was no gap between the test pieces T and the pressure applied to the test pieces T was 10 kg/cm$^2$, the peel-off fracture stresses of the samples ♦ ranged from 22 to 27 kgf/mm$^2$, and hence are relatively high. When there is a gap between the test pieces T, the samples exhibited high peel-off fracture stresses, close to fracture stresses of the parent metal irrespective of the speed at which the laser beam welding machines moves and the position in which the laser beam is focused.

Figure 6:
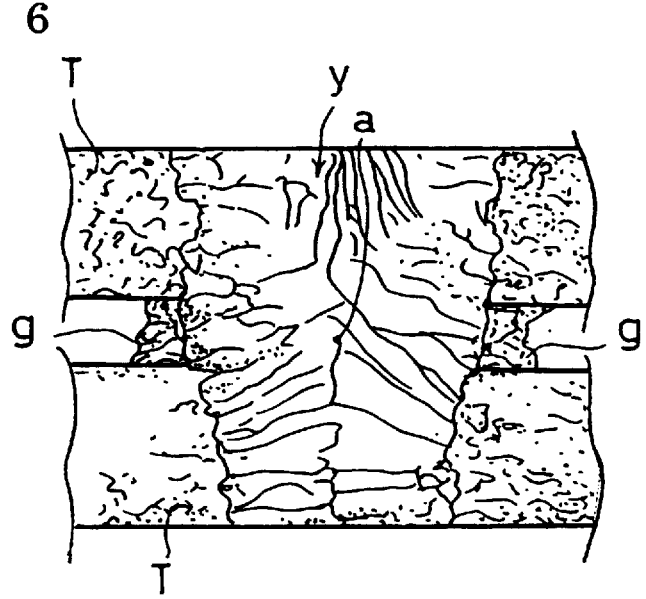
FIG. 6 is an enlarged cross-sectional view of a welded area of the test pieces with a gap defined therebetween.
Figure 7:
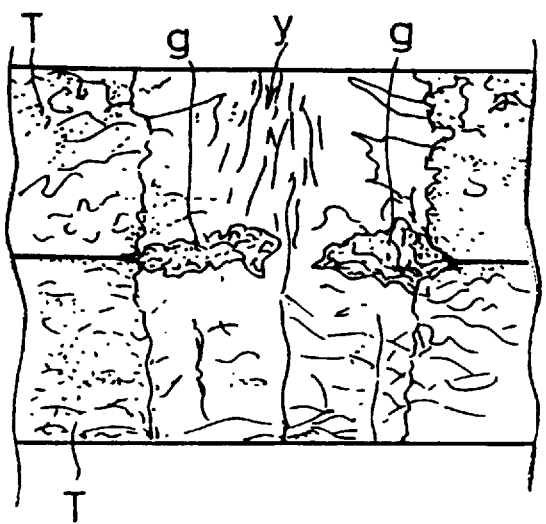
FIG. 7 is an enlarged cross-sectional view of a welded area of the test pieces with no gap defined therebetween.

The changes in the peel-off fracture stresses depending on the gap between the test pieces T are clearly seen in microstructure diagrams of welded areas shown in FIGS. 6 and 7. When there is no gap between the test pieces T as shown in FIG. 7, unwanted components "g" such as aluminum, etc. separated mainly from the plated aluminum layers on the overlapping surfaces cannot find their way out, and are trapped and solidified in an welded area "y". When there is a gap between the test pieces T as shown in FIG. 6, those unwanted components "g" are expelled from a welded area "y" into the gap due to the different solidification temperatures, and solidified in the gap.

Based on the above test data, it has been found that when there is a gap between aluminum-plated steel panels which are welded, a sufficient bonding strength is achieved between the welded aluminum-plated steel panels, and when there is no gap between aluminum-plated steel panels which are welded, a desired bonding strength cannot be obtained between the welded aluminum-plated steel panels unless the laser beam welding machine moves at sufficiently low speed, i.e., the amount of thermal energy of the applied laser beam per unit area is large enough.

Figure 9:
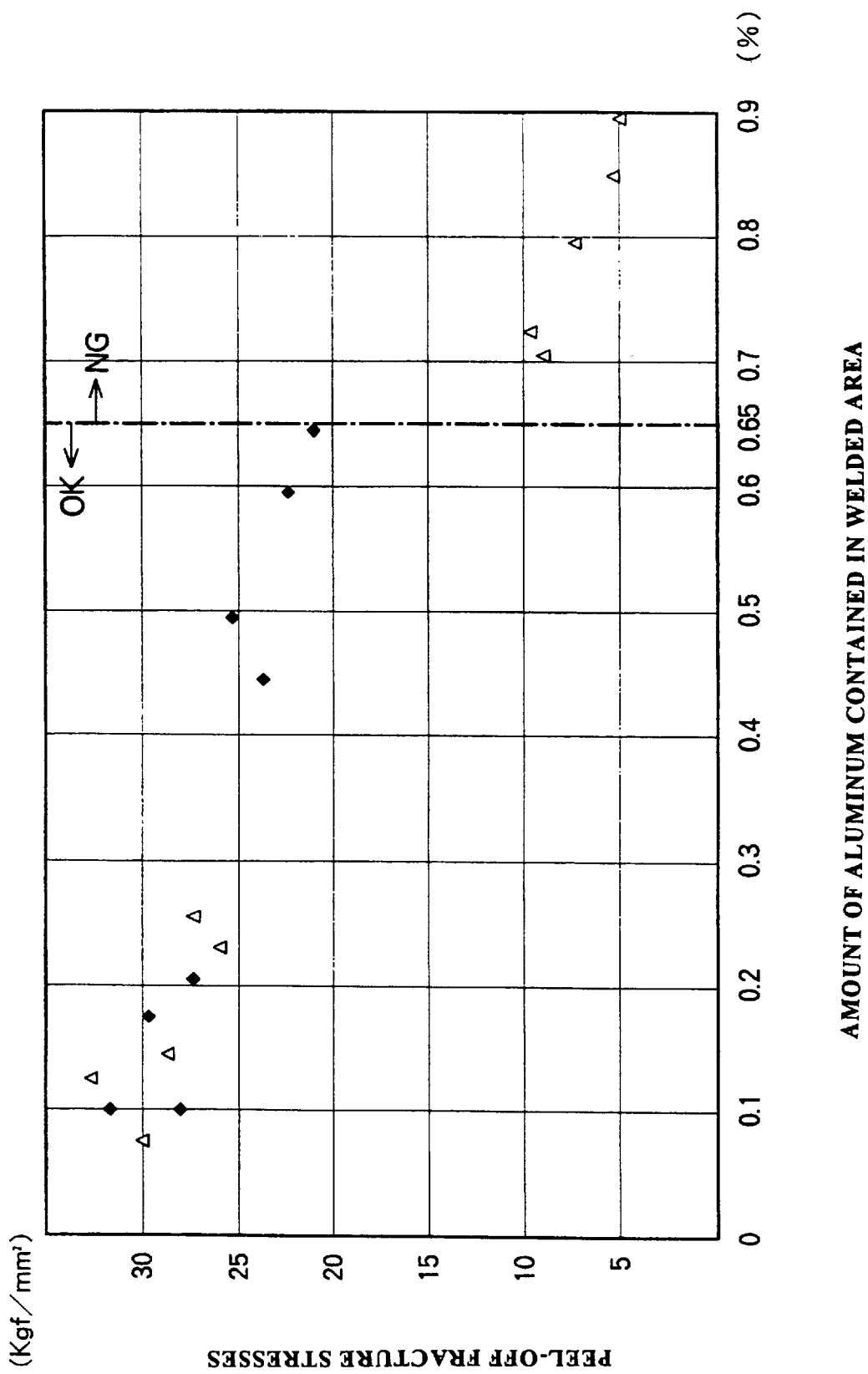
FIG. 9 is a graph showing the relationship between the amount of aluminum in the welded area and the peel-off fracture stresses.

The inventors have considered that the aluminum contained in the welded area "y" may have a bearing on the tensile strength of the welded area "y", and checked how the amount of aluminum contained in the central region of the welded area is related to the peel-off fracture stresses. FIG. 9 shows the measured relationship between the amount of aluminum contained in a central region "a" (see FIG. 6) of the welded area "y" and the peel-off fracture stresses. Actually, FIG. 9 shows the results of a tensile test, similar to the tensile test described above with reference to FIG. 8, conducted on test pieces T to check the bonding strength after the test pieces T were laser-beam-welded at different gaps therebetween under the same conditions as described above with reference to FIG. 8. In FIG. 9, the horizontal axis represents the amount of aluminum contained in the welded area, and the vertical axis represents the peel-off fracture stresses.

It can be understood from FIG. 9 that if the amount of aluminum contained in the welded area "y" is 0.65 weight % or less, then the peel-off fracture stresses of the welded test pieces T are the same as those (27~28 kgf/cm$^2$) of the parent metal, and if the amount of aluminum contained in the welded area "y" is greater than 0.65 weight %, then the peel-off fracture stresses of the welded test pieces T are lower than those of the parent metal. Therefore, the aluminum contained in the welded area "y" is related to the tensile strength such that the bonding strength of the welded area "y" increases as the amount of aluminum contained in the welded area "y" decreases. It can also be seen from FIGS. 8 and 9 that in order to reduce the amount of aluminum contained in the welded area "y" for achieving a desired bonding strength, it is effective to provide a gap at the welded area and increase the amount of thermal energy of the applied laser beam per unit area as by lowering the speed at which the laser beam welding machine moves. Consequently, it is preferable that the amount of aluminum contained in the welded area "y" be 0.65 weight % or less for achieving a desired level of bonding strength.

Figure 4:
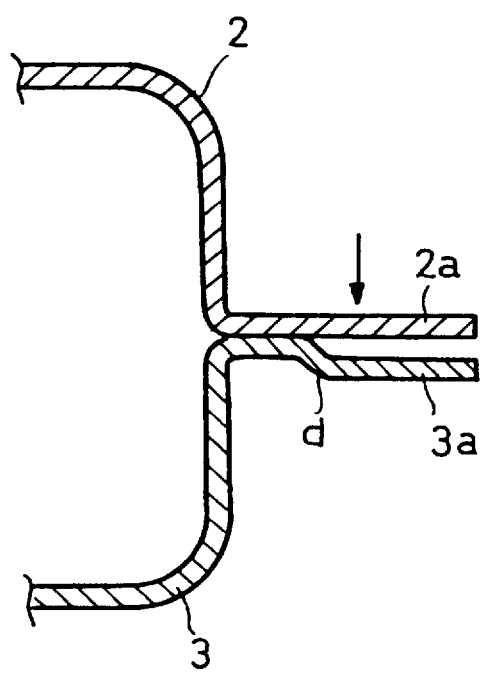
FIG. 4 is a fragmentary cross-sectional view of a fuel tank comprising welded aluminum-plated steel panels, one of which has a stepped region to create an outwardly open gap.

FIGS. 3 and 4 fragmentarily show fuel tanks, respectively, comprising aluminum-plated steel panels which are welded according to the welding method shown in FIG. 2(A).

In FIG. 3, the fuel tank comprises upper and lower shell members 2, 3 having respective flanges 2a, 3a overlapped and welded to each other. The lower flange 3a has a stepped region "d" extending along an inner peripheral edge thereof and spaced downwardly from the upper flange 2a, creating a gap opening inwardly into the fuel tank. The upper and lower flanges 2a, 3a are welded to each other by a laser beam, indicated by the arrow, applied downwardly to the upper flange 2a above the stepped region "d". Since the upper and lower flanges 2a, 3a are held in intimate contact with each other along their outer edges, the upper and lower flanges 2a, 3a can easily be clamped together by clamps.

In FIG. 4, the fuel tank comprises upper and lower shell members 2, 3 having respective flanges 2a, 3a overlapped and welded to each other. The lower flange 3a has a stepped region "d" extending along an outer peripheral edge thereof and spaced downwardly from the upper flange 2a, creating a gap opening outwardly of the fuel tank. The upper and lower flanges 2a, 3a are welded to each other by a laser beam, indicated by the arrow, applied downwardly to the upper flange 2a above the stepped region "d". Inasmuch as the upper and lower flanges 2a, 3a are held out of contact with each other along their outer edges, they cannot be clamped together by clamps along their outer edges unless spacers are inserted between the upper and lower flanges 2a, 3a. However, the fuel tank shown in FIG. 4 offers an advantage in that unwanted components such as of aluminum separated from the welded area "y" (see FIG. 6) are prevented from entering the fuel tank, but can easily be discharged out through the outwardly open gap between the upper and lower flanges 2a, 3a.

As described above, a gap can easily be provided between the flanges 2a, 3a by providing the stepped region "d" on one of the flanges 2a, 3a.

Since the fuel tank according to the present invention is made up of aluminum-plated steel panels welded to each other, the welded area formed between the aluminum-plated steel panels is protected by a sacrificial corrosion-resistant action of aluminum, making the inner surface of the fuel tank highly resistant to corrosion. The aluminum-plated steel panels do not need to be post-treated by coating layers thereon.

Because the aluminum-plated steel panels are welded by a laser beam having a small beam spot, any area in which the surface layers of the aluminum-plated steel panels are destroyed by the laser beam is minimized. The laser beam welding allows the aluminum-plated steel panels to be welded at high speed as they can be heated quickly at a localized spot.

The laser beam welding does not require any welding electrodes to be brought into contact with the aluminum-plated steel panels. As a consequence, it is free of the problem of aluminum segments becoming attached to welding electrodes.

The gap formed between the aluminum-plated steel panels allows unwanted components to be discharged from the welded area. Therefore, those unwanted components discharged from the welded area are not introduced into the melted metal in the welded area, which thus keeps a desired level of bonding strength.

While the laser beam welding has been described in the above embodiments, the principles of the present invention are also applicable to welding aluminum-plated steel panels according to electron beam welding.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A method of manufacturing a fuel tank of aluminum-plated steel panels, comprising the steps of:

overlapping respective flanges of a pair of shell members of aluminum-plated steel panels with a gap defined between the flanges; and welding said flanges to each other with a beam applied closely to said gap while discharging unwanted components from a welded area into said gap, thereby forming a fuel tank, wherein one of said shell members of aluminum-plated steel panels is provided along the entire peripheral length of said flange thereof with a stepped region spaced from the other of said shell members, thereby defining said gap between said flanges, and wherein the beam is focussed on said flange above said gap close to said stepped region to discharge unwanted components into said gap.

2. A method according to claim 1, wherein said beam is applied perpendicularly to said flanges.

3. A method of manufacturing a fuel tank according to claim 1, wherein said gap opens inwardly into the fuel tank.

4. A method of manufacturing a fuel tank according to claim 1, wherein said gap opens outwardly of the fuel tank.

5. A method of manufacturing a fuel tank of aluminum-plated steel panels, comprising the steps of:

overlapping respective flanges of a pair of shell members of aluminum-plated steel panels; and welding said flanges to each other with a beam, thereby forming a fuel tank, wherein one of said flanges projects a larger distance outwardly than the other flange, and said beam is applied obliquely to an outer peripheral edge of said other flange from a beam welding machine while the beam welding machine is moving fully along outer peripheral edges of the flanges.

6. A method of laser-beam-welding aluminum-plated steel panels, comprising the steps of:

overlapping flanges of a pair of aluminum-plated steel panels with a gap defined therebetween;

welding said flanges to each other with a beam applied closely to said gap while discharging unwanted components from a welded area into said gap; and wherein one of said aluminum-plated steel panels has a stepped region spaced from the other of the aluminum-plated steel panels, thereby defining said gap between said stepped region and said other of the aluminum-plated steel panels.

7. A method according to claim 6, for manufacturing a container of the welded aluminum-plated steel panels, wherein said gap opens inwardly into the container.

8. A method according to claim 6, for manufacturing a container of the welded aluminum-plated steel panels, wherein said gap opens outwardly of the container.

* * * * *